United States Patent
Cagenius et al.

(10) Patent No.: US 8,289,980 B2
(45) Date of Patent: Oct. 16, 2012

(54) METHOD FOR ESTABLISHING A UNICAST MEDIA SESSION

(75) Inventors: Torbjörn Cagenius, Sollentuna (SE); Ayodele Damola, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 732 days.

(21) Appl. No.: 12/097,583

(22) PCT Filed: Sep. 5, 2006

(86) PCT No.: PCT/EP2006/066008
§ 371 (c)(1),
(2), (4) Date: Jun. 16, 2008

(87) PCT Pub. No.: WO2007/071461
PCT Pub. Date: Jun. 28, 2007

(65) Prior Publication Data
US 2008/0310435 A1    Dec. 18, 2008

(30) Foreign Application Priority Data
Dec. 19, 2005    (WO) ............... PCT/EP2005/056922

(51) Int. Cl.
*H04L 12/28* (2006.01)

(52) U.S. Cl. ............... 370/401; 710/316; 379/242
(58) Field of Classification Search ............... 370/401; 709/228, 249
See application file for complete search history.

(56) References Cited

U.S. PATENT DOCUMENTS
2006/0041688 A1* 2/2006 Wright et al. ............... 709/249
2008/0059640 A1* 3/2008 Oka et al. ............... 709/228

FOREIGN PATENT DOCUMENTS
WO    WO 02/09387    *    1/2002
WO    WO 02/09387 A    1/2002
WO    WO 2006/045706 A1    5/2006

* cited by examiner

*Primary Examiner* — Robert Wilson
*Assistant Examiner* — Lionel Preval

(57) ABSTRACT

A method and IP Multimedia Subsystem (IMS) gateway for establishing a unicast media session between a media receiver and a media source in an IMS network via a Network Address Translation (NAT) function acting on behalf of the media receiver. A media source controller in the IMS sends a Session Initiation Protocol (SIP) INVITE message to the media receiver to identify the media source. The media receiver obtains NAT bindings for the unicast media session, and the session is established between the media receiver and the media source.

10 Claims, 3 Drawing Sheets

METHOD FOR ESTABLISHING A UNICAST MEDIA SESSION

This application claims the benefit of PCT/EP2005/056922, filed 19 Dec. 2005, the disclosure of which is fully incorporated herein by reference.

TECHNICAL FIELD

The present invention relates to a method and apparatus for establishing a unicast media session, preferably but not necessarily utilising a set top box (STB).

BACKGROUND

IP Multimedia (IPMM) services provide a dynamic combination of voice, video, messaging, data, etc. within the same session. By growing the numbers of basic applications and the media that it is possible to combine, the number of services offered to the end users will grow, and the inter-personal communication experience will be enriched. This will lead to a new generation of personalised, rich multimedia communication services, including so-called "combinational IP Multimedia" services, which are considered in more detail below.

IP Multimedia Subsystem (IMS) is the technology defined by the Third Generation Partnership Project (3GPP) to provide IP Multimedia services over 3G mobile communication networks (3GPP TS 23.228 and TS 24.229 Release 5 and Release 6). IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and web servers). The Session Description Protocol (SDP), carried by SIP signalling, is used to describe and negotiate the media components of the session. Other protocols are used for media transmission and control, such as Real-time Transport Protocol and Real-time Transport Control Protocol (RTP/RTCP), Message Session Relay Protocol (MSRP), Hyper Text Transfer Protocol (HTTP).

The boundaries between the services provided by telecommunication operators, TV operators, and internet service providers are disappearing, and such companies are offering customers all three services (so called "triple play"). For telecommunication operators wishing to offer TV services, a popular choice is to utilize so called IPTV, which delivers a TV service over IP and the customer's broadband connection (e.g. ADSL, VDSL, Public Ethernet, etc.).

With the convergence between IPTV services and the IMS infrastructure, a new range of possibilities opens up for an end user to utilize their TV set. For example, videoconferencing, interactive gaming, personalized advertisement or interactive TV programmes with viewers' feedback are easily achievable using IMS.

In order to be able to view IPTV broadcasts, the end user requires a device that can receive IPTV media, such as a set top box (STB), that may or may not be IMS enabled or have SIP functionality. Means are required to enable the establishment of an RTP media session, such as an IPTV media session, from the IMS network to a device such as a STB for displaying the RTP media content.

SUMMARY

Signalling required to establish a unicast media session, such as Real-time Transport Protocol and Real Time Streaming Protocol signalling, generally includes an exchange of source and destination addresses and ports. A media receiver, such as a Set Top Box, must transmit its IP address and port number when communicating with the source of the unicast media data, in order that the media data is delivered to the correct location, and vice versa. A Network Address Translation (NAT) function, used to translate an IP address, or a Network Address and Port Translator (NAPT), used to translate both the address and the port number, is interposed between the source and the receiver. Where a NAT or NAPT is used, the IP address and port number provided by the media receiver to the media source will not identify the media receiver, and so the unicast media data cannot be delivered to the correct location. This is because the media receiver will include, in the setup signalling, its own local IP address and port number on the media receiver's side of the NAT function, which is different from the IP address and port number on the media source side of the NAT function.

According to a first aspect of the invention, there is provided a method of establishing a unicast media session between a media receiver and a media source via a Network Address Translation function acting on behalf of the media receiver, the media source being within an IP Multimedia Subsystem, the method comprising:
  using a Session Initiation Protocol INVITE method between a media source controller within the IP Multimedia Subsystem and the media receiver to identify the media source to the media receiver;
  obtaining, at the media receiver, Network Address Translation bindings for the unicast media session;
  establishing a unicast media session between the media receiver and the media source using the Network Address Translation bindings.

In the present specification, the term Network Address Translation is used to cover both a NAT function and a NAPT.

Preferably, the Network Address Translation function is disposed at a Residential Gateway.

The unicast media session may be an IPTV media session.

The unicast media session may be a Real-time Transport Protocol media session, and it may further be established using Real Time Streaming Protocol.

It is preferred that the media receiver comprises a Set Top Box. The media receiver may further comprise a Home IP Multimedia Subsystem Gateway coupled to the Set Top Box.

The method may comprise sending the SIP INVITE message from an IPTV Application Server in response to a request message sent from user equipment to the IPTV Application Server.

Preferably, the method comprises communicating between the media receiver and the media source via an IPTV Application Server.

According to a second aspect of the invention, there is provided a Home IP Multimedia Subsystem Gateway comprising:
  a first interface for communicating with a remote network, the remote network comprising a media source;
  a second interface for communicating with a non-IP Multimedia Subsystem enabled device;
  means to obtain Network Address Translation bindings for a unicast service sent from the media source;
  means to provide the Network Address Translation bindings to the non-IP Multimedia Subsystem enabled device.

According to a third aspect of the invention, there is provided a media receiver comprising:
  an interface for communicating with a remote network, the remote network comprising a media source;

means to obtain Network Address Translation bindings for a unicast service sent from the media source.

means to establish a unicast media session between the media receiver and a media source using the Network Address Translation bindings.

It is preferred that the means to establish a unicast media session use Real Time Streaming Protocol.

DETAILED DESCRIPTION

Figure 1A:
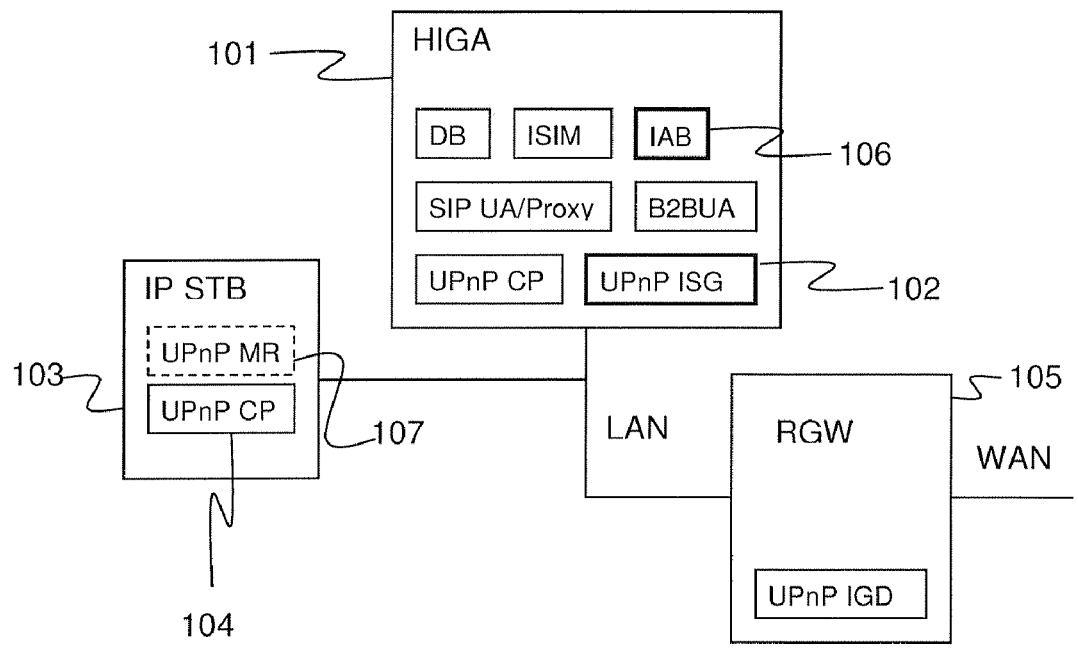
FIG. 1A illustrates schematically a Home IMS Gateway comprising an IMS Service Gateway within a home network.

Referring to FIG. 1A, a Set Top Box (STB) 103 for receiving IPTV signals is provided within the home. The STB is coupled to a Local Area Network (LAN). The STB 103 of FIG. 1 is not IMS-enabled, but is a Universal Plug and Play (UPnP) device. As the STB 103 is not IMS-enabled, it cannot communicate directly with a media source from a remote IMS network.

The STB 103 comprises a UPnP Control Point (CP) 104, which allows the STB 103 to receive and register services available from other devices on the LAN.

The STB 103 further comprises a UPnP Media Renderer (MR) 107, which enables the STB to render media content such as video. The MR 107 provides a set of rendering controls in which the UPnP CP can control how the media content is rendered by the STB, including control for various features such as volume, brightness, sharpness etc.

A Residential Gateway (RGW) 105 is connected between the LAN and an access network. The RGW is a device that is used to connect multiple devices on the LAN to a single cable or DSL line for service access, including e.g. IPTV and Internet access. In order to allow service access to more than one device on the LAN, the RGW 105 has NAT functionality. The STB 103 communicates with remote devices outside the LAN via the RGW 105.

In order to allow the non-IMS enabled STB 103 to communicate with a remote IMS network, a Home IMS Gateway (HIGA) 101 is also disposed in the LAN. The HIGA 101 is disposed in a control plane of the LAN. The HIGA 101 implements a range of functions to assist inter-working between IMS and non-IMS enabled device 103 on the LAN.

The HIGA comprises an IMS Service Gateway (ISG) 102, which is preferably implemented in the same physical box as the HIGA 101. The UPnP ISG device 102 is a logical entity that advertises a set of communication services to a UPnP device 103 on the LAN. The UPnP ISG device 102 introduces the IMS and SIP services. Each of the communication services advertised by the ISG 102 allows non-IMS enabled UPnP devices to establish media connections with remote SIP or IMS clients by invoking the relevant UPnP actions in the ISG 102. Many different types of action are possible, depending on the function of the non-IMS enabled UPnP device. For example, for a STB, an access content action is provided to enable the STB on the LAN to access multimedia content such as IPTV stored in the remote IMS system.

The ISG 102 uses the UPnP protocol to communicate with other devices on the LAN. It advertises its presence on the LAN by sending a discovery advertisement message: Device available—NOTIFY with ssdp:alive. The message is sent as a multicast over User Datagram Protocol (UDP) to a standard address and port. Control points within the devices on the LAN listen to this port to detect when new capabilities are available on the LAN. To advertise the full extent of its capabilities, the ISG device 102 multicasts a number of discovery messages corresponding to the services available. The UPnP ISG advertises the remote SIP and IMS services and this is registered by the UPnP Control Points of the STB 103.

The UPnP description for the ISG device 102 is partitioned into two parts; the device description describes properties of the HIGA, while the "service description" describes the services available via the HIGA. The "device description" lists basic properties of the HIGA as well as all services it supports.

The HIGA further comprises a UPnP Control Point (CP), a logical entity that controls device points; that is to say, the UPnP CP retrieves a description and list of available services of the UPnP devices on the LAN such as the STB 103 or the RGW 105.

The HIGA also comprises an IMS Address Book (IAB) 106 to facilitate communication between non-IMS enabled devices on the LAN and remote IMS services. The IAB 106 includes a database of addresses.

A SIP User Agent (SIP UA) is also provided which allows the HIGA 101 to work with the Session Initiation Protocol for initiating IMS sessions.

The HIGA 101 may be implemented in a separate physical box or integrated in any other box in the home, e.g. the Residential Gateway (RGW) 105 or the STB 103.

Figure 1B:
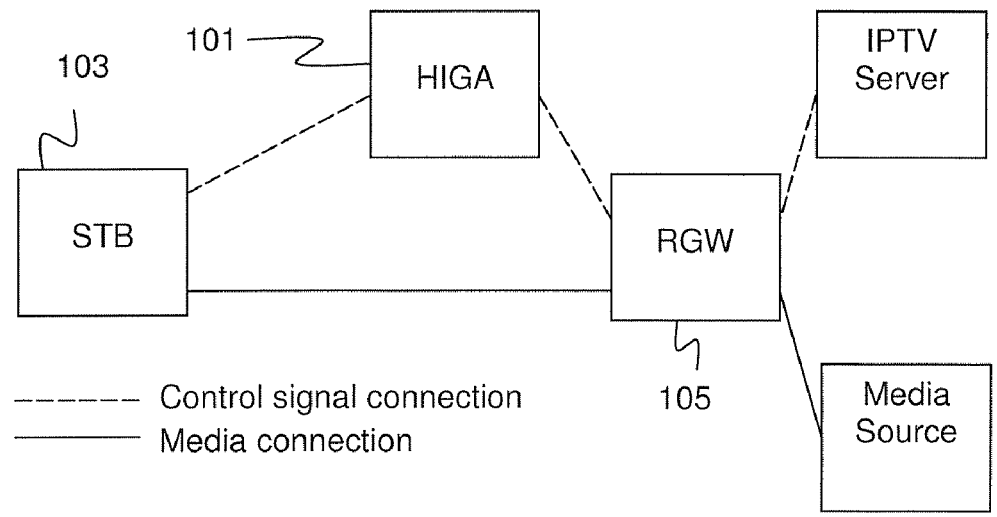
FIG. 1B illustrates schematically the control plane and the media plane for the scenario of FIG. 1A.

Referring to FIG. 1B, there is illustrated schematically the control plane and the media plane for this embodiment. Control plane signalling passes between an IPTV application server and the STB 103 via the HIGA 101 and the RGW 105. The media plane passes between the media source and the STB 103 via the RGW 105.

Figure 2:
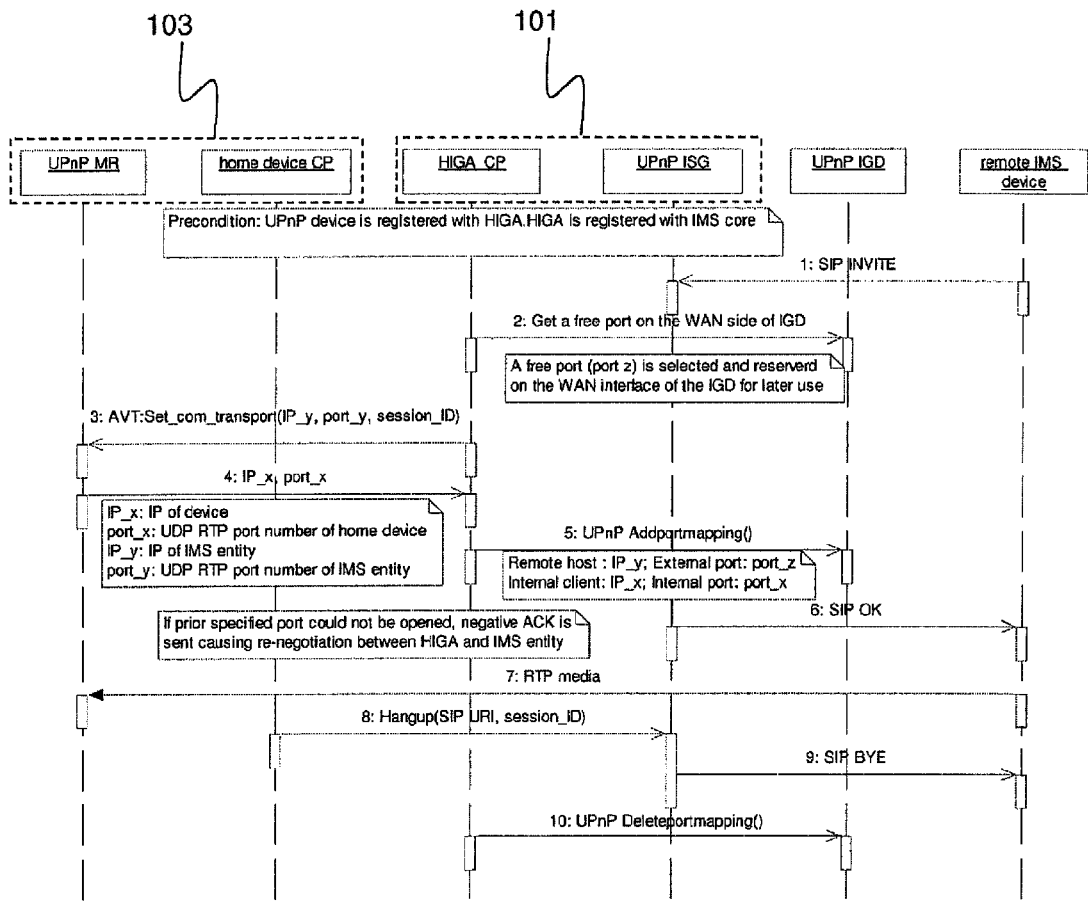
FIG. 2 illustrates services and actions of inbound SIP INVITE handling where an STB is located on a home network.

Referring to FIG. 2, there are illustrated services and actions of inbound SIP INVITE handling in the case of a non-IMS enabled STB 103. It is a precondition that the STB 103 is registered with the HIGA 101, and the HIGA 101 is registered with the IMS core. For incoming SIP INVITE messages establishing an IPTV media session, appropriate UDP ports must be opened in the residential gateway (RGW) 105 for the RTP media. The SIP INVITE in message 1 triggers a sequence of actions (2-5). These actions lead to the creation of a Network Address Translation (NAT) binding for RTP media in the RGW. The sequence of actions is as follows:

1. A SIP invite is received from a remote IMS device. Where the SIP invite is for initiating an IPTV media session, the remote IMS device is an IMS video Application Server.

2. On receipt of the SIP invite at the ISG 102, the Internet Gateway Device (IGD) in the RGW 105 reserves a free UDP port in the IGD.

3. A UPnP action at the STB media renderer 107 is invoked, which passes the port number of the remote IMS device as the source port of media to the RTP stack in the Media Renderer device 107. The UPnP action is preferably included in the AVTransport service. This action informs the RTP stack of the media renderer of the IP address and port of the video source. The syntax of the action is as follows:

IP,port Set_com_transport(IP', port', ID)

IP: IP address of STB on the LAN

IP': IP address of the remote IMS device

Port: Port number on which the STB is ready to receive RTP

Port': Port number on which the remote IMS device is ready to receive RTP

ID: unique identifier of the session which is assigned by the HIGA

4. The RTP stack of the media renderer 107 returns the UDP port on which the client application is ready to receive media.

5. The logic in the UPnP gateway device invokes an Addportmapping action, which creates a NAT binding between the remote media source and the STB. IP-y in FIG. 2 refers to the IP address of the remote media source and IP_x refers to the IP address of the STB.

6. The SIP OK message is sent to the remote IMS device, which triggers RTP media to be sent to the media renderer 107 of the STB 103 from the remote IMS client.

7. RTP media is sent to the media renderer 107 of the STB 103 from the remote IMS device, e.g. a Streaming Server (SS).

8. When the user wishes to terminate the IPTV session, termination is initiated via the UPnP Hangup action. A session ID is passed from the STB 103 via an internal message.

9. The UPnP Hangup action triggers a SIP BYE to be sent to the remote IMS device informing the remote IMS device of session termination.

10. The NAT binding for the session is removed.

RTSP Session Setup

According to a second embodiment, an STB 108 is IMS enabled and need not be registered with a HIGA. However, means are still required to allow an IPTV session to be established with the STB 108, as signalling between the STB 108 and the media source traverses a NAT function disposed at an RGW. When it is required to establish an RTP media session with an IMS enabled STB 108, in combination with RTSP for media control, the NAT traversal for the IPTV media must be set up. For example, where TV content is ordered from an IPTV Application Server (IPTV AS) using another IMS device such as a mobile phone, the media content can then be played out on a UPNP and IMS enabled media renderer device such as a STB 108.

Figure 3:
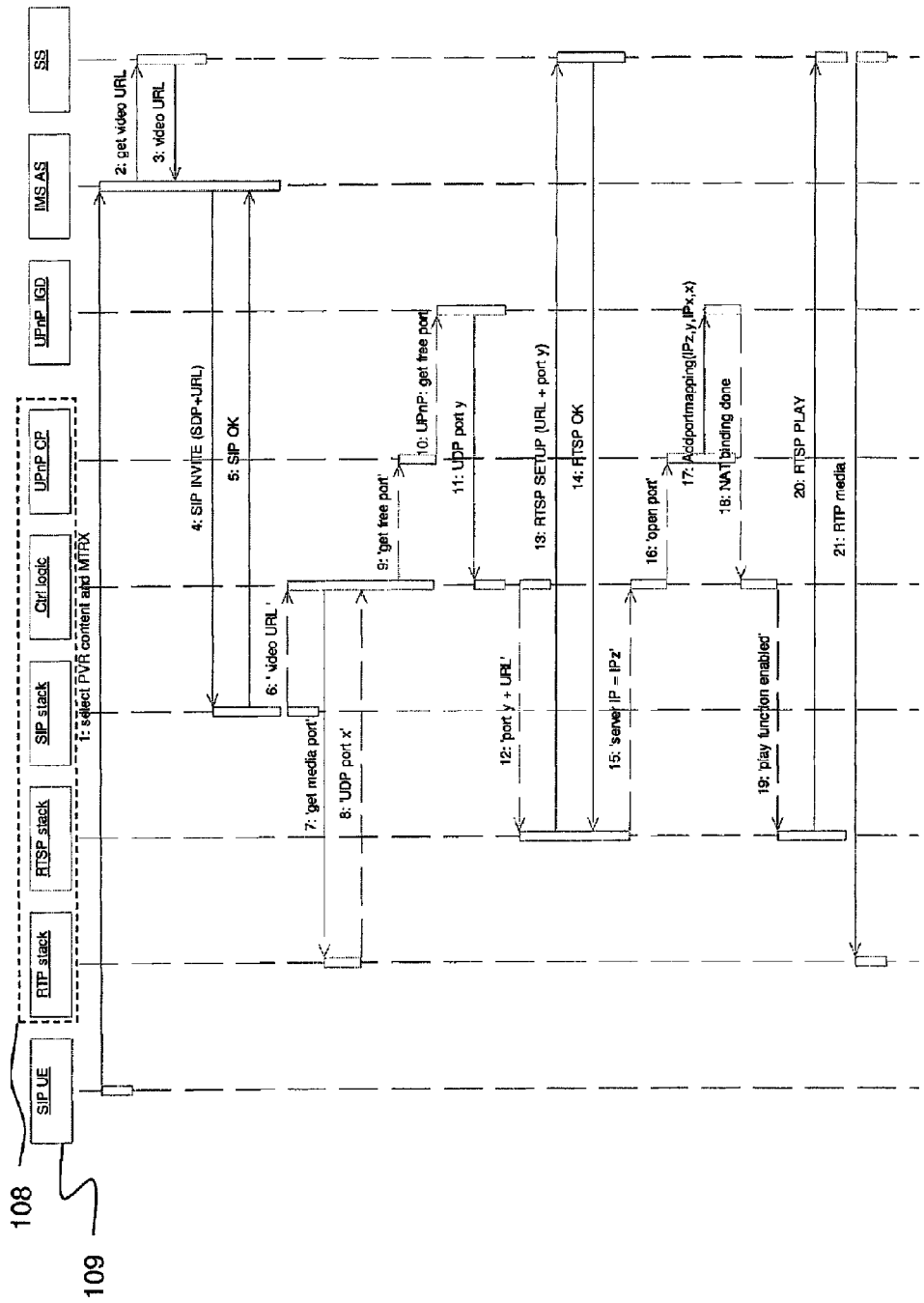
FIG. 3 illustrates signalling to establish a Real-time Transport Protocol session.

An STB 108 may use protocols other than SIP to negotiate the media ports. In an IPTV scenario, the media session setup in the STB 108 may be carried out using the RTSP protocol. FIG. 3 illustrates signalling to set up a Real-Time Streaming Protocol (RTSP) session. In this scenario, the session is initiated by User Equipment 109, although it will be appreciated that similar signalling can be used for a session initiated either by the remote media source or by the STB 108. The signalling is as follows:

1. The user selects the desired media content and specifies the identity of the play device, in this case the STB 108 on the LAN. A request message is sent from User Equipment 109, such as a mobile telephone, to an IPTV AS via a secure TCP/TLS connection with the IPTV AS.

2. Based on the user selection of a relevant URL, the required video content is requested from a SS.

3. The video URL is returned from the SS to the IPTV AS in form of an RTSP URL.

4. The IPTV AS sends a SIP INVITE message to the SIP stack of the STB 108. The SIP INVITE message contains the RTSP URL and a media description of the video content. The control logic module of the STB 108 enables the coordination of the interaction between the different protocol stacks.

5. A SIP OK response is sent back from the STB 108 to the IPTV AS.

6. The INVITE message received by the SIP stack triggers a message containing the video URL to be sent to the control logic.

7. A request is made to the RTP stack of the STB 108 for the UDP port on which it is ready to receive media.

8. The RTP stack returns a UDP port number for RTP media.

9. A request for the initiation of a UPnP action to get a free IGD UDP port is made.

10. A request for a free UDP port on the WAN side of the IGD is made via UPnP.

11. A free UDP port on the WAN side of the IGD, port y, is returned.

12. The identity of a UDP port y on the IGD, and the RTSP URL to the video are communicated to the RTSP stack.

13. An RTSP SETUP message is sent to the SS indicating the receiving media port. The receiving media port is the negotiated UDP port on the IGD WAN interface. For security reasons, the SS may be inaccessible to end user devices. In this case, all RTSP communication with the end user RTSP client is carried out explicitly with the IPTV AS via a secure channel. The IPTV AS then forwards the RTSP messages to the SS. Messages from the SS to the RTSP client are also sent via the AS.

An alternative to media negotiation using SIP is to use RTSP DESCRIBE. In this instance, the DESCRIBE message is sent prior to message 13, but the control logic must first pass the client port number to the RTSP stack.

14. The SS receives the SETUP message from the RTSP stack and responds with an RSTP OK message.

15. The RTSP OK message, sent from the SS to the RTSP stack, triggers an internal message to be sent to the control logic specifying the IP address of the SS.

16. The control logic sends an internal message requesting the creation of a NAT binding.

17. A UPnP action Addportmapping creates a NAT binding in the IGD.

18. An internal message is sent from the IGD to the control logic of the STB 108, notifying the control logic that the NAT binding is created.

19. An internal message is sent from the control logic to the RTSP stack informing it of the "play ready" status of the video content. Prior to this message, the play function of the STB is disabled, and becomes enabled on receipt of this internal message.

20. Depending upon the user input, the RTSP stack requests video content to be streamed by sending RSTP play command to the SS.

21. The RTP stream is sent to the prior specified IGD IP address and port where it is translated to the local IP and UDP port of the RTP stack of the STB 108.

The commands in messages 6, 7, 9, 12, 15, 16 and 19 of FIG. 3 are internal messages between the STB control logic and the various protocol stacks of the STB. The control logic provides an event driven mechanism to exchange data between the different protocol stacks.

In an alternative embodiment, the IMS-enabled STB 108 initiates the IPTV session. The user selects the desired video content from, for example, a web portal having a list of URLs, each URL directed to different video content or different IPTV Application Servers. A SIP INVITE is sent from the STB 108 to the IPTV AS, and the IPTV AS returns a SIP OK message. In this embodiment, the SIP OK message rather than the SIP INVITE message contains the SDP and the URL.

It will be apparent to one skilled in the art that various modifications may be made to the embodiments described above without departing from the scope of the present inven-

The invention claimed is:

1. A method of establishing a unicast media session between a Universal Plug and Play (UPnP) media receiver and an IP Multimedia Subsystem (IMS) media source within an IMS network, the method comprising the steps of:
   registering the UPnP media receiver with a Home IMS Gateway, wherein the UPnP media receiver utilizes only UPnP signaling;
   registering the Home IMS Gateway with the IMS network;
   sending by the IMS media source, a Session Initiation Protocol (SIP) INVITE message to the Home IMS Gateway;
   creating by the Home IMS Gateway utilizing UPnP signaling, Network Address Translation (NAT) bindings between the UPnP media receiver and the IMS media source; and
   establishing the unicast media session between the UPnP media receiver and the IMS media source using the NAT bindings.

2. The method according to claim 1, wherein the unicast media session is an IPTV media session.

3. The method according to claim 1, wherein the unicast media session is a Real-time Transport Protocol media session.

4. The method according to claim 1, wherein the unicast media session is established using Real Time Streaming Protocol.

5. The method according to claim 1, wherein the UPnP media receiver comprises a Set Top Box.

6. The method according to claim 1, wherein the step of sending the SIP INVITE message includes sending the SIP INVITE message from an IPTV Application Server in response to a request message sent from user equipment to the IPTV Application Server.

7. The method according to claim 1, further comprising communicating between the UPnP media receiver and the IMS media source via an IPTV Application Server.

8. A Universal Plug and Play (UPnP) media receiver that is not enabled to utilize an IP Multimedia Subsystem (IMS) network, the UPnP media receiver comprising:
   a control interface for registering with a Home IMS Gateway and for receiving from the Home IMS Gateway, Network Address Translation (NAT) bindings for a unicast service initiated by an IMS media source in the IMS network, wherein the UPnP media receiver utilizes only UPnP signaling; and
   means for establishing a unicast media session between the UPnP media receiver and the IMS media source using the NAT bindings.

9. The UPnP media receiver according to claim 8, wherein the means for establishing a unicast media session uses Real Time Streaming Protocol.

10. A Home IP Multimedia Subsystem (IMS) Gateway, comprising:
   a first interface for registering a Universal Plug and Play (UPnP) media receiver that is not an IMS-enabled device, wherein the UPnP media receiver utilizes only UPnP signaling;
   a second interface for registering the Home IMS Gateway with an IMS network, the IMS network including an IMS media source, and for receiving from the IMS media source, a Session Initiation Protocol (SIP) INVITE message to initiate establishment of a unicast session between the UPnP media receiver and the IMS media source;
   means for utilizing UPnP signaling to obtain Network Address Translation (NAT) bindings for a unicast service sent from the IMS media source; and
   means for providing the NAT bindings to the UPnP media receiver to establish the unicast session between the UPnP media receiver and the IMS media source.

* * * * *

UNITED STATES PATENT AND TRADEMARK OFFICE
CERTIFICATE OF CORRECTION

PATENT NO. : 8,289,980 B2  
APPLICATION NO. : 12/097583  
DATED : October 16, 2012  
INVENTOR(S) : Cagenius et al.

Page 1 of 1

It is certified that error appears in the above-identified patent and that said Letters Patent is hereby corrected as shown below:

In Fig. 2, Sheet 2 of 3, below "2:", in Box, in Line 1, delete "reserverd" and insert -- reserved --, therefor.

In Column 3, Line 14, delete "FIG. 1A." and insert -- FIG. 1A; --, therefor.

In Column 5, Line 6, delete "HIGA" and insert -- HIGA. --, therefor.

In Column 5, Line 41, delete "UPNP" and insert -- UPnP --, therefor.

In Column 6, Line 30, delete "RSTP" and insert -- RTSP --, therefor.

In Column 6, Line 47, delete "RSTP" and insert -- RTSP --, therefor.

Signed and Sealed this  
Fifth Day of February, 2013

Teresa Stanek Rea  
*Acting Director of the United States Patent and Trademark Office*